United States Patent
Chou et al.

(10) Patent No.: US 11,734,022 B2
(45) Date of Patent: Aug. 22, 2023

(54) METHOD OF REMOTELY MODIFYING BASIC INPUT/OUTPUT SYSTEM CONFIGURATION SETTING

(71) Applicant: FLYTECH TECHNOLOGY CO., LTD., Taipei (TW)

(72) Inventors: Li-Chun Chou, Taipei (TW); Shui-Chin Tsai, Taipei (TW); Ting-You Liou, Taipei (TW); Chien-Lin Su, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 61 days.

(21) Appl. No.: 17/495,586

(22) Filed: Oct. 6, 2021

(65) Prior Publication Data

US 2022/0357960 A1 Nov. 10, 2022

(30) Foreign Application Priority Data

May 4, 2021 (TW) .................................. 110116047

(51) Int. Cl.
*G06F 9/44* (2018.01)
*G06F 9/445* (2018.01)
*G06Q 20/20* (2012.01)

(52) U.S. Cl.
CPC ....... *G06F 9/44505* (2013.01); *G06Q 20/202* (2013.01)

(58) Field of Classification Search
None
See application file for complete search history.

(56) References Cited

U.S. PATENT DOCUMENTS

| 7,480,907 B1 | 1/2009 | Marolia et al. |
| 2015/0154092 A1* | 6/2015 | Chen ...................... G06F 9/4401 713/2 |
| 2017/0031694 A1* | 2/2017 | Chu ...................... G06F 9/4416 |

(Continued)

FOREIGN PATENT DOCUMENTS

WO 2019/147360 A1 8/2019

OTHER PUBLICATIONS

Search Report appended to an Office Action, which was issued to Taiwanese counterpart application No. 110116047 by the TIPO dated Mar. 9, 2022, with an English translation thereof (2 pages).

(Continued)

*Primary Examiner* — Keshab R Pandey
(74) *Attorney, Agent, or Firm* — Hamre, Schumann, Mueller & Larson, P.C.

(57) ABSTRACT

A method of remotely modifying a basic input/output system (BIOS) configuration setting includes steps of: transmitting, by a remote computer, a modification instruction to a cloud server; transmitting, by the cloud server to a POS system, a new configuration value of the BIOS configuration setting contained in the modification instruction; determining, by an embedded controller of the POS system, whether the new configuration value is identical to an original configuration value of the BIOS configuration setting; and by the embedded controller when a result of the determination is negative, updating the BIOS configuration setting and transmitting a response instruction to the remote computer.

12 Claims, 2 Drawing Sheets

(56) References Cited

U.S. PATENT DOCUMENTS

2019/0223004 A1* 7/2019 Yang .................. H04L 41/0806
2019/0147360 A1* 8/2019 Martin et al.

OTHER PUBLICATIONS

Combined Search and Examination Report issued to U.K. counterpart application No. 2114366.4 by the UKIPO dated Jun. 7, 2022 (11 pages).

* cited by examiner

METHOD OF REMOTELY MODIFYING BASIC INPUT/OUTPUT SYSTEM CONFIGURATION SETTING

CROSS-REFERENCE TO RELATED APPLICATION

This application claims priority of Taiwanese Invention Patent Application No. 110116047, filed on May 4, 2021.

FIELD

The disclosure relates to a method of remotely modifying a basic input/output system (BIOS) configuration setting, and more particularly to a method of remotely modifying a basic input/output system (BIOS) configuration setting of a point-of-sale (POS) system.

BACKGROUND

Conventionally, a POS system is customized by manually modifying basic input/output system (BIOS) configuration settings thereof, e.g., to assign a voltage of a COM port or to control system sound volume of the POS system. However, whenever multiple POS systems in separated locations (e.g., different convenience stores) are to be customized based on different demands, such approach may be time consuming and labor intensive, resulting in inconvenience of use.

SUMMARY

Therefore, an object of the disclosure is to provide a method of remotely modifying a basic input/output system (BIOS) configuration setting that can alleviate at least one of the drawbacks of the prior art.

According to one aspect of the disclosure, the method is implemented by a point-of-sale (POS) system, a cloud server and a remote computer. The cloud server is in communication with the POS system and the remote computer. The POS system includes a microcontroller, an embedded controller, a BIOS and a storage. The embedded controller is electrically connected to the microcontroller and the storage.

The method includes steps of:

by the remote computer, generating a modification instruction that contains a new configuration value of the BIOS configuration setting for the BIOS, and transmitting the modification instruction to the cloud server;

by the cloud server in response to receipt of the modification instruction, transmitting the new configuration value contained in the modification instruction to the microcontroller of the POS system;

by the microcontroller in response to receipt of the new configuration value, transmitting the new configuration value to the embedded controller of the POS system;

by the embedded controller when receiving the new configuration value, determining whether the new configuration value is identical to an original configuration value of the BIOS configuration setting for the BIOS, the original configuration value being stored in advance in the storage; and by the embedded controller when it is determined that the new configuration value is not identical to the original configuration value, updating the BIOS configuration setting by storing the new configuration value in the storage to replace the original configuration value, and transmitting via the microcontroller and the cloud server to the remote computer a response instruction which indicates successful modification of the BIOS configuration setting of the POS system with the new configuration value.

According to another aspect of the disclosure, the method is implemented by a point-of-sale (POS) system, a cloud server and a remote computer. The cloud server is in communication with the POS system and the remote computer. The POS system includes an embedded controller, a BIOS and a storage. The embedded controller has communication capability, and is electrically connected to the storage.

The method includes steps of:

by the remote computer, generating a modification instruction that contains a new configuration value of the BIOS configuration setting for the BIOS, and transmitting the modification instruction to the cloud server;

by the cloud server in response to receipt of the modification instruction, transmitting the new configuration value contained in the modification instruction directly to the embedded controller of the POS system; and by the embedded controller when receiving the new configuration value directly from the cloud server, determining whether the new configuration value is identical to an original configuration value of the BIOS configuration setting for the BIOS, the original configuration value being stored in advance in the storage; and by the embedded controller when it is determined that the new configuration value is not identical to the original configuration value, updating the BIOS configuration setting by storing the new configuration value in the storage to replace the original configuration value, and transmitting via the cloud server to the remote computer a response instruction which indicates successful modification of the BIOS configuration setting of the POS system with the new configuration value.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
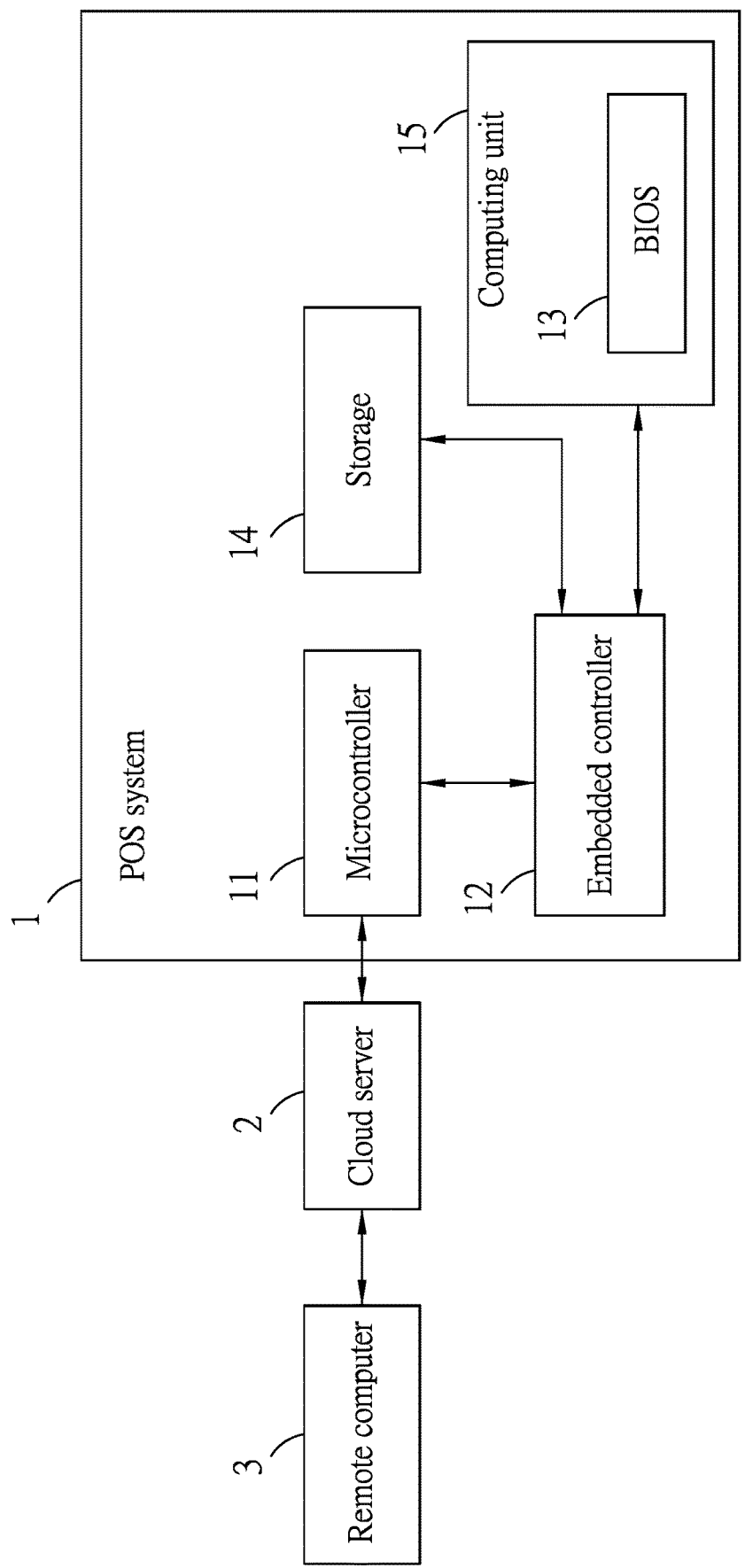
FIG. 1 is a block diagram illustrating an embodiment of a system that implements a method of remotely modifying a basic input/output system (BIOS) configuration setting according to the disclosure.
Figure 2:
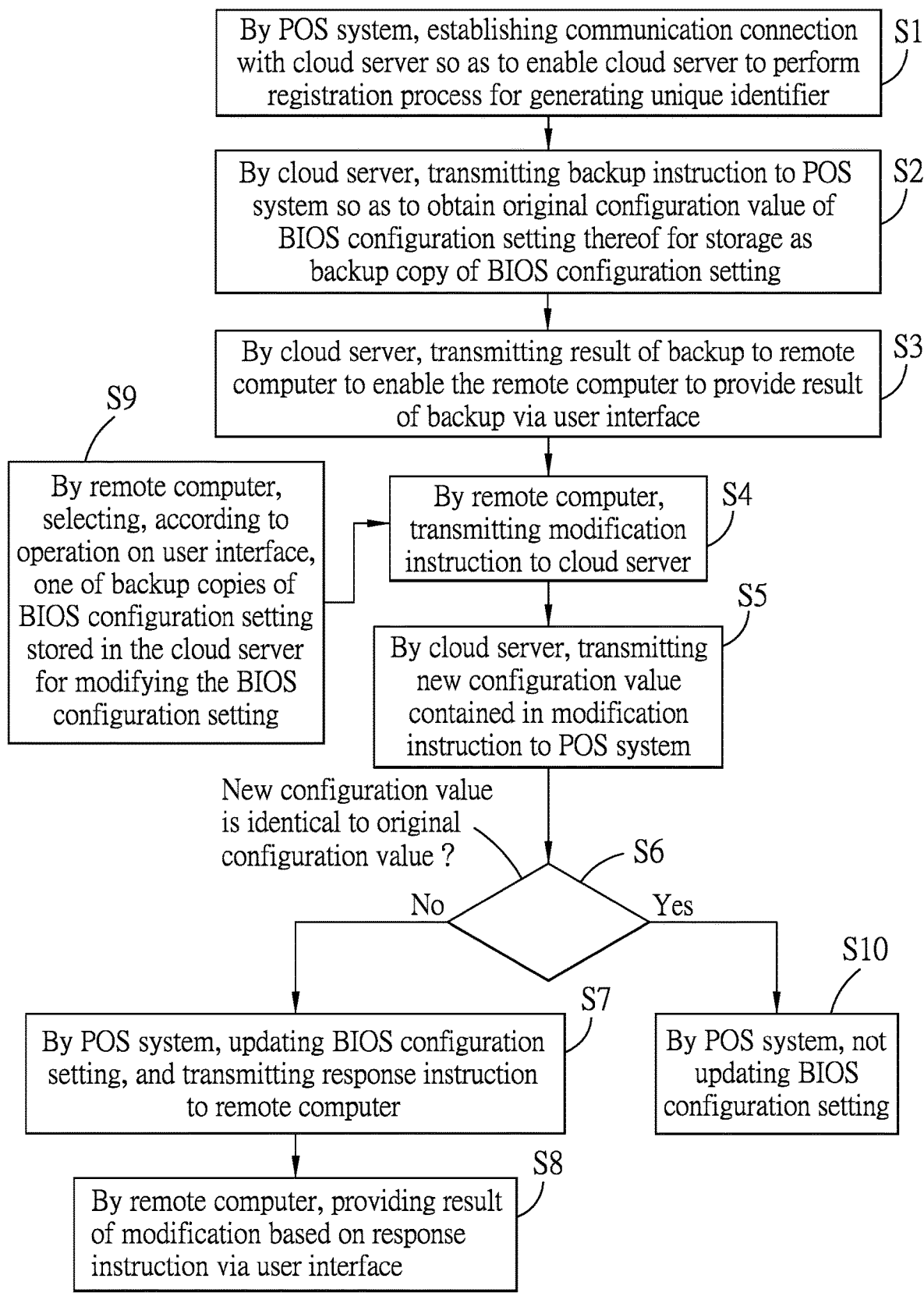
FIG. 2 is a flow chart illustrating an embodiment of the method according to the disclosure.

Referring to FIGS. 1 and 2, an embodiment of a system that implements a method of remotely modifying a basic input/output system (BIOS) configuration setting according to the disclosure is illustrated. The system includes a point-of-sale (POS) system 1, a cloud server 2 and a remote computer 3. The cloud server 2 is in communication with the POS system 1 and the remote computer 3.

The remote computer 3 may be implemented to be a desktop computer, a laptop computer, a notebook computer, a tablet computer, or any computing device that has network communication capability, but implementation of the remote computer 3 is not limited to what are disclosed herein and may vary in other embodiments.

The POS system 1 may be disposed on a checkout counter of a shop. The POS system 1 includes a microcontroller 11, an embedded controller 12, a BIOS 13, a storage 14 and a computing unit 15. The embedded controller 12 is electrically connected to the microcontroller 11, the storage 14 and the computing unit 15.

The microcontroller 11 has network communication capability, and is configured to communicate with the cloud server 2. In this embodiment, the cloud server and the microcontroller 11 of the POS system 1 communicate with each other by means of message queuing telemetry transport (MQTT). The microcontroller 11 and the embedded controller 12 communicate with each other by using the inter integrated circuit (I$^2$C) communication protocol.

The embedded controller 12 is configured to, by using the I$^2$C communication protocol, read data from the storage 14 or write data to the storage 14. In addition, the embedded controller 12 is further configured to control operations of lower-layer components (e.g., operations of a keyboard, operations of a backlight panel, or charging and discharging of a battery) of the POS system 1.

The storage 14 may be implemented by, but is not limited to, flash memory, a hard disk drive (HDD) or a solid state disk (SSD), electrically-erasable programmable read-only memory (EEPROM) or any other non-volatile memory devices. The storage 14 is configured to store BIOS configuration settings of the POS system 1. In particular, the BIOS configuration settings are stored in the JavaScript Object Notation (JSON) file format which is indicated by a filename extension ".json". In this embodiment, the storage 14 is separated from the microcontroller 11 and the embedded controller 12. However, in other embodiments, the storage 14 may be integrated in the microcontroller 11 or the embedded controller 12.

The computing unit 15 may be implemented by a combination of a southbridge chipset and a central processing unit (CPU), or a System on a Chip (SoC). The computing unit 15 is configured to perform the BIOS 13 by executing a BIOS code. In some embodiments, the BIOS code may be stored in the storage 14, in nonvolatile memory (not shown) electrically connected to the computing unit 15, or in the computing unit 15.

It is worth to note that the BIOS 13 is a kind of boot firmware which is used to perform hardware initialization during a booting procedure of a personal computer (PC) or an industrial computer, to initialize an operating system from a boot device, and to then manage communication between the operating system and system hardware. The BIOS 13 may be implemented to be, but not limited to, Extensible Firmware Interface (EFI) BIOS, Unified EFI (UEFI) BIOS, legacy BIOS, or any BIOS that provides legacy BIOS compatibility through the compatibility support module (CSM). In one embodiment, the BIOS 13 is implemented by the UEFI BIOS to function as an interface between an operating system and system hardware, and the BIOS configuration settings may be related to functions for supporting booting and system operation.

Referring to FIG. 2, the method includes steps S1 to S10 delineated below.

In step S1, when the POS system 1 boots up for the very first time, the POS system 1 establishes a communication connection with the cloud server 2 so as to enable the cloud server 2 to perform a registration process for generating a unique identifier corresponding to the POS system 1. It is worth to note that the unique identifier is related to a network location of the POS system 1, and the cloud server 2 identifies the POS system 1 based on the unique identifier. In this embodiment, the computing unit 15 performs the BIOS 13 during booting up of the POS system 1.

In step S2, after the unique identifier corresponding to the POS system 1 has been generated, the cloud server 2 generates a backup instruction, and transmits the backup instruction to the microcontroller 11 of the POS system 1. In response to receipt of the backup instruction, the microcontroller 11 transmits the backup instruction to the embedded controller 12 of the POS system 1 so as to enable the embedded controller 12 to store in the storage 14 a current configuration value of one of the BIOS configuration settings for the BIOS 13 (referred to as "the BIOS configuration setting" hereinafter) to serve as an original configuration value, and to transmit the original configuration value via the microcontroller 11 to the cloud server 2 for storage of the original configuration value in the cloud server 2 to serve as a backup copy of the BIOS configuration setting for the BIOS 13 of the POS system 1. It should be noted that the backup instruction may enable the embedded controller 12 to store in the storage 14 current configuration values of multiple ones of the BIOS configuration settings for the BIOS 13. It is noted that a configuration value of the BIOS configuration setting stored in the storage 14 (e.g., the original configuration value) is referred to by the computing unit 15 for operation of the BIOS 13.

In step S3, after the cloud server 2 has stored the original configuration value as the backup copy, the cloud server 2 transmits to the remote computer 3 a result of backup that contains the backup copy. Additionally, in response to receipt of the result of backup transmitted by the cloud server 2, the remote computer 3 provides the result of backup via a user interface (e.g., a webpage). As a result, a user is able to browse the user interface (i.e., the webpage) to check the BIOS configuration setting of the POS system 1 by directly operating the remote computer 3, or by using another computer that is connected to the remote computer 3 to remotely operate the remote computer 3.

In step S4, to modify the BIOS configuration setting of the POS system 1, the remote computer 3 generates a modification instruction that contains a new configuration value of the BIOS configuration setting for the BIOS 13 of the POS system 1, and transmits the modification instruction to the cloud server 2. Specifically, the remote computer 3 provides the user interface that is operable to enable the remote computer 3 to generate the modification instruction. In this embodiment, the user interface is implemented by a webpage. However, in other embodiments, the user interface is implemented to be an application program. In some embodiments, the user interface may be operated for entry of the new configuration value to enable the remote computer 3 to generate the modification instruction. In a scenario where the POS system 1 is plural in number and the cloud server 2 generates multiple unique identifiers respectively for the POS systems 1, a user is able to select, via the user interface (i.e., the webpage) provided by the remote computer 3, one of the POS systems 1 the BIOS configuration setting of which is to be modified for generating the modification instruction that contains the new configuration value and that indicates said one of the POS system 1 thus selected.

In step S5, in response to receipt of the modification instruction, the cloud server 2 transmits, based on the unique identifier corresponding to the PCS system 1 the BIOS configuration setting of which is to be modified, the new configuration value contained in the modification instruction to the microcontroller 11 of the POS system 1.

In step S6, in response to receipt of the new configuration value, the microcontroller 11 of the POS system 1 transmits the new configuration value to the embedded controller 12 of the POS system 1. When receiving the new configuration value, the embedded controller 12 determines whether the new configuration value is identical to the original configuration value of the BIOS configuration setting for the BIOS 13. It should be noted that the original configuration value is stored in advance (i.e., step S2) in the storage 14. When it is determined that the new configuration value is not identical to the original configuration value, a flow of procedure of the method proceeds to step S7. Otherwise, the flow of procedure proceeds to step S10. It is worth to note that, compared with the original configuration value, the new configuration value is a newer version of value for the BIOS configuration setting.

In step S7, the embedded controller 12 updates the BIOS configuration setting by storing the new configuration value in the storage 14 to replace the original configuration value, and transmits via the microcontroller 11 and the cloud server 2 to the remote computer 3 a response instruction which indicates successful modification of the BIOS configuration setting of the POS system 1 with the new configuration value. It should be noted that every time in response to receipt of the response instruction that is transmitted by the POS system 1 to the remote computer 3, the cloud server 2 stores the new configuration value that corresponds to the POS system 1 and that is obtained from the modification instruction as another backup copy of the BIOS configuration setting for the BIOS 13 of the POS system 1.

In step S8, in response to receipt of the response instruction transmitted by the embedded controller 12 of the POS system 1, the remote computer 3 provides, via the user interface, a result of modification that presents both the new configuration value of the BIOS configuration setting and the POS system 1 to which the modification instruction containing the new configuration value was transmitted. In this way, a user is able to see the latest functioning BIOS configuration setting of this specific POS system 1 via the user interface provided by the remote computer 3.

In step S9, the remote computer 3 is able to select any one of the backup copies of the BIOS configuration setting stored in the cloud server 2 to be saved or to be removed. Specifically, the remote computer 3 makes such selection according to operation on the user interface. Moreover, a user is able to select, via the user interface provided by the remote computer 3, one of the backup copies of the BIOS configuration setting stored in the cloud server 2 to be used to replace a current BIOS configuration setting of the POS system 1, and then the remote computer 3 would generate the modification instruction based on the selected one of the backup copies of the BIOS configuration settings stored in the cloud server 2.

In one embodiment where the POS system 1 is plural in number, the remote computer 3 generates, according to operation on the user interface, multiple modification instructions for a group of POS systems including multiple ones of POS systems selected from among the POS systems 1 based on a selected one of the backup copies of the BIOS configuration settings of any of the POS systems 1 stored in the cloud server 2, wherein each of the multiple modification instructions contains the configuration value of the selected BIOS configuration setting and indicates the corresponding one of the POS systems thus selected. In this way, a user is able to concurrently replace, via operation on the user interface (i.e., the webpage) provided by the remote computer 3, different configuration values of the BIOS configuration settings of multiple ones of the POS systems with an identical configuration value (i.e., the selected one of the backup copies) by virtue of the modification instructions.

In one embodiment, each of the POS systems 1 is operable to change the original configuration value of the BIOS configuration setting stored in the storage 14 thereof into a modified configuration value, and then to transmit the modified configuration value to the cloud server 2 for storage of the modified configuration value therein to serve as one of the backup copies of the BIOS configuration setting for the POS system 1. In this way, after a user has manually operated one of the POS systems 1 to modify the BIOS configuration setting of the POS system 1 on site by changing the original configuration value into the modified configuration value, the POS system 1 would transmit the modified configuration value to the cloud server 2 for backup purposes. Later, the remote computer 3 is able to generate one or more modification instructions based on such backup stored in the cloud server 2 so as to modify the BIOS configuration setting of one of more other POS systems.

In step S10, the embedded controller 12 does not update the BIOS configuration setting. In other words, the embedded controller 12 does not replace the original configuration value stored in the storage 14 with the new configuration value.

In one embodiment where the embedded controller 12 has network communication capability and is connected to the cloud server 2, the microcontroller 11 may be omitted. In response to receipt of the modification instruction, the cloud server 2 transmits the new configuration value contained in the modification instruction directly to the embedded controller 12 of the POS system 1. When receiving the new configuration value directly transmitted by the cloud server 2, the embedded controller 12 determines whether the new configuration value is identical to the original configuration value stored in the storage 14.

In summary, the method of remotely modifying a BIOS configuration setting according to the disclosure utilizes the remote computer 3 and the cloud server 2 to set and modify configuration value(s) of the BIOS configuration setting(s) of the POS system(s) 1. In this way, both time and labor may be saved. Moreover, for each of the BIOS configuration settings, the method according to the disclosure utilizes the cloud server 2 to store different versions of the BIOS configuration setting (i.e., different configuration values that have been assigned to the BIOS configuration setting) so as to maintain revision history thereof. Therefore, version control of the BIOS configuration settings may be realized. For example, in a scenario where a preferred configuration value of the BIOS configuration setting of the POS system 1 is missing because the BIOS 13 of the POS system 1 has been updated, the BIOS configuration setting may be recovered to have the preferred configuration value by using the backup copy of the BIOS configuration setting stored in the cloud server 2.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of remotely modifying a basic input/output system (BIOS) configuration setting, implemented by a point-of-sale (POS) system, a cloud server and a remote computer, the cloud server being in communication with the POS system and the remote computer, the POS system including a microcontroller, an embedded controller, a BIOS and a storage, the embedded controller being electrically connected to the microcontroller and the storage, the method comprising:

by the remote computer, generating a modification instruction that contains a new configuration value of the BIOS configuration setting for the BIOS, and transmitting the modification instruction to the cloud server;

by the cloud server in response to receipt of the modification instruction, transmitting the new configuration value contained in the modification instruction to the microcontroller of the POS system;

by the microcontroller in response to receipt of the new configuration value, transmitting the new configuration value to the embedded controller of the POS system;

by the embedded controller when receiving the new configuration value, determining whether the new configuration value is identical to an original configuration value of the BIOS configuration setting for the BIOS, the original configuration value being stored in advance in the storage; and by the embedded controller when it is determined that the new configuration value is not identical to the original configuration value, updating the BIOS configuration setting by storing the new configuration value in the storage to replace the original configuration value, and transmitting via the microcontroller and the cloud server to the remote computer a response instruction which indicates successful modification of the BIOS configuration setting of the POS system with the new configuration value.

2. The method as claimed in claim 1, wherein the generating a modification instruction includes providing, by the remote computer, a user interface that is operable to enable the remote computer to generate the modification instruction, the method further comprising:

by the remote computer in response to receipt of the response instruction transmitted by the embedded controller of the POS system, providing, via the user interface, a result of modification that presents the new configuration value of the BIOS configuration setting and the POS system to which the modification instruction containing the new configuration value was transmitted.

3. The method as claimed in claim 1, prior to the generating a modification instruction, further comprising:

establishing, by the POS system when the POS system boots up for the very first time, a communication connection with the cloud server so as to enable the cloud server to perform a registration process for generating a unique identifier corresponding to the POS system; and identifying, by the cloud server, the POS system based on the unique identifier.

4. The method as claimed in claim 3, further comprising:

by the cloud server after the unique identifier corresponding to the PCS system has been generated and prior to transmitting the new configuration value to the microcontroller of the POS system, generating a backup instruction, and transmitting the backup instruction to the microcontroller; and by the microcontroller in response to receipt of the backup instruction, transmitting the backup instruction to the embedded controller of the POS system so as to enable the embedded controller to store in the storage a current configuration value of the BIOS configuration setting for the BIOS to serve as the original configuration value, and to transmit the original configuration value via the microcontroller to the cloud server for storage of the original configuration value in the cloud server to serve as a backup copy of the BIOS configuration setting for the BIOS of the POS system.

5. The method as claimed in claim 4, further comprising:

by the cloud server after the cloud server has stored the original configuration value as the backup copy, transmitting to the remote computer a result of backup that contains the backup copy; and by the remote computer in response to receipt of the result of backup transmitted by the cloud server, providing the result of backup via the user interface.

6. The method as claimed in claim 5, further comprising:

by the cloud server every time in response to receipt of the response instruction that is transmitted by the POS system to the remote computer, storing the new configuration value corresponding to the POS system as another backup copy of the BIOS configuration setting for the BIOS of the POS system; and by the remote computer, selecting any one of the backup copies of the BIOS configuration setting stored in the cloud server to be saved or to be removed.

7. The method as claimed in claim 6, the POS system is plural in number, wherein the generating a modification instruction includes:

by the remote computer according to operation on the user interface and based on a selected one of the backup copies of the BIOS configuration settings of any of the POS systems stored in the cloud server, generating multiple modification instructions for a group of POS systems that includes multiple ones of the POS systems selected from among the POS system.

8. The method as claimed in claim 7, further comprising:

changing, by one of the POS systems, the original configuration value of the BIOS configuration setting stored in the storage thereof into a modified configuration value; and transmitting, by the one of the POS systems, the modified configuration value to the cloud server for storage of the modified configuration value therein to serve as one of the backup copies of the BIOS configuration setting for the one of the POS systems.

9. The method as claimed in claim 6, wherein the generating a modification instruction includes:
   selecting, by the remote computer according to operation on the user interface, one of the backup copies of the BIOS configuration setting stored in the cloud server; and
   generating, by the remote computer, the modification instruct ion based on the selected one of the backup copies of the BIOS configuration settings stored in the cloud server.

10. The method as claimed in claim 1, the embedded controller having communication capability and being connected to the cloud server, the method further comprising:
   by the cloud server in response to receipt of the modification instruction, transmitting the new configuration value contained in the modification instruction to the embedded controller of the POS system; and
   by the embedded controller of the POS system when receiving the new configuration value directly transmitted by the cloud server, determining whether the new configuration value is identical to the original configuration value stored in the storage.

11. The method as claimed in claim 1, wherein the cloud server and the microcontroller of the POS system communicate with each other by means of message queuing telemetry transport (MQTT).

12. A method of remotely modifying a basic input/output system (BIOS) configuration setting, implemented by a point-of-sale (POS) system, a cloud server and a remote computer, the cloud server being in communication with the POS system and the remote computer, the POS system including an embedded controller, a BIOS and a storage, the embedded controller having communication capability and being electrically connected to the storage, the method comprising:
   by the remote computer, generating a modification instruction that contains a new configuration value of the BIOS configuration setting for the BIOS, and transmitting the modification instruction to the cloud server;
   by the cloud server in response to receipt of the modification instruction, transmitting the new configuration value contained in the modification instruction directly to the embedded controller of the POS system; and
   by the embedded controller when receiving the new configuration value directly from the cloud server, determining whether the new configuration value is identical to an original configuration value of the BIOS configuration setting for the BIOS, the original configuration value being stored in advance in the storage; and
   by the embedded controller when it is determined that the new configuration value is not identical to the original configuration value, updating the BIOS configuration setting by storing the new configuration value in the storage to replace the original configuration value, and transmitting via the cloud server to the remote computer a response instruction which indicates successful modification of the BIOS configuration setting of the POS system with the new configuration value.

* * * * *